(12) United States Patent
Lobert

(10) Patent No.: US 6,225,915 B1
(45) Date of Patent: May 1, 2001

(54) DEVICE FOR TRANSMITTING COMMANDS TO THE EQUIPMENT OF AN INSTALLATION, ESPECIALLY OF AN ELECTRICAL INSTALLATION AND INSTALLATION CONTROLLED BY SUCH A DEVICE

(75) Inventor: Jean-Pierre Lobert, Vanves (FR)

(73) Assignee: Electricite de France-Service National, Paris (FR)

( * ) Notice: Subject to any disclaimer, the term of this patent is extended or adjusted under 35 U.S.C. 154(b) by 0 days.

(21) Appl. No.: 08/911,070

(22) Filed: Aug. 14, 1997

(51) Int. Cl.⁷ .................................................. G08C 19/00
(52) U.S. Cl. ................................ 340/825.69; 340/825.72
(58) Field of Search ...................... 340/825.22, 825.69, 340/825.72, 310.01, 310.08; 379/103; 455/352

(56) References Cited

U.S. PATENT DOCUMENTS

| | | | |
|---|---|---|---|
| 4,691,341 | | 9/1987 | Knoble .................................. 379/97 |
| 4,749,992 | | 6/1988 | Fitzemeyer et al. ............ 340/870.02 |
| 5,086,385 | * | 2/1992 | Launey et al. ....................... 364/188 |
| 5,109,222 | * | 4/1992 | Welty ............................... 340/825.72 |
| 5,168,170 | * | 12/1992 | Hartig ..................................... 307/35 |
| 5,449,987 | | 9/1995 | McMillan .............................. 318/266 |
| 5,452,291 | * | 9/1995 | Eisenhandler et al. ................ 370/54 |
| 5,537,104 | * | 7/1996 | Van Dort ......................... 340/825.22 |
| 5,691,715 | * | 11/1997 | Ouellette .......................... 340/870.09 |

FOREIGN PATENT DOCUMENTS

| 503699 | 9/1992 | (EP) . |
|---|---|---|
| WO8904578 | 5/1989 | (WO) . |

* cited by examiner

Primary Examiner—Michael Horabik
Assistant Examiner—Matsuichiro Shimizu
(74) Attorney, Agent, or Firm—Sughrue, Mion, Zinn Macpeak & Seas, PLLC

(57) ABSTRACT

A device for transmitting commands to a suite of equipment, such as for example, equipment found in an abode. The device is capable of sending and receiving control signals in the form of modulated infrared or radio waves. The device is also capable of transmitting control signals via carrier currents to equipment of the installation to be actuated. Logic is included in the device for purposes such as decoding and synchronizing received electrical signals. The device further includes electrically erasable memory for storing a file containing commands organized in accordance with the configuration of the installation. The device can further be linked with other devices to generate the file of commands organized according to the configuration of the installation.

11 Claims, 3 Drawing Sheets

DEVICE FOR TRANSMITTING COMMANDS TO THE EQUIPMENT OF AN INSTALLATION, ESPECIALLY OF AN ELECTRICAL INSTALLATION AND INSTALLATION CONTROLLED BY SUCH A DEVICE

BACKGROUND OF THE INVENTION

The present invention relates to a device for transmitting commands and which is able to be adapted to a processor which is found in PC personal computers or in game consoles.

SUMMARY OF THE INVENTION

This device is intended to be used alone or interposed between the serial port of the processor and an item of control receiver equipment which may be located in household electrical equipment, receivers or relays for commands or else, the future multiservice socket for EDF GDF services.

The principle of transmitting data signals between the device according to the invention and the receiver is founded on the modulation of infrared waves or radio waves of very high frequency, of the order of 1.4 GHz.

The subject of the invention is therefore a device for transmitting commands to a suite of equipment of an electrical installation especially of an abode, including means of sending and receiving control signals in the form of modulated infrared or radio waves in conjunction with means for transmitting control signals via carrier currents to equipment of the installation to be actuated, characterized in that it furthermore includes logic for decoding and synchronizing electrical signals received by the receiving means, an electrically erasable memory for storing a file containing commands organized in accordance with the configuration of the installation and means for linking the device with means for generating the file of commands organized according to the configuration of the installation and in that the means for sending and receiving control signals comprise a receiver of identity signals relating to zones of the installation and emanating from corresponding sending means, a sender of control signals to the said means of transmitting via carrier currents and a modem linking the said sending and receiving means to the decoding and synchronization logic unit;

the electrically erasable memory is an EEPROM memory or a FLASH memory;

the device includes operating buttons intended to control the sending by the device of macrocommands stored in the file located in the memory and each containing a series of instructions intended for particular items of equipment of the installation which are required to be actuated so as to place it in a situation determined by the macrocommand;

the device is furthermore linked in a removable manner to a microprocessor effecting detailed commands for equipment of the installation located in one of several zones of the said installation or else for general-interest equipment, the transmitting device being linked by its means of linking to the microprocessor and the latter being associated with software for managing the installation allowing the transmitting device to transmit commands intended for specific appliances of the installation;

the microprocessor forms part of a game console and the management software is stored in a cartridge plugged into the box of the game console;

the microprocessor forms part of a PC type microcomputer to which the device is connected.

The subject of the invention is also an installation intended to be controlled by a transmitting device of the type defined above, characterized in that it includes infrared or radio-wave relays for transmitting the control signals received from the control device to the appliances of the installation, the said relays being linked to the said appliances by a carrier-current line.

According to other characteristics:

the installation furthermore includes a multiservice box linked to the carrier-current line and to a line of the distribution network or to a telephone line effecting the carrier-current link with a distribution agency and provided with an infrared or radio-wave relay for communicating with the transmitting device so as to interpret and transmit, by way of the carrier-current line to the appliances of the installation, the instructions which concern them contained in the commands which it receives from the transmitting device;

the multiservice box includes a memory for storing the file organized according to the configuration of the installation, and a file for converting the macrocommands into series of individual commands for the equipment, means for connection with the means of linking of the transmitting device so as to load the file organized according to the configuration of the installation into the memory for storing the file of the multiservice box;

the multiservice box is linked by the line of the distribution network or by the telephone line to the means of generating the file organized according to the configuration of the installation, the loading of the file being effected directly by way of the line of the distribution network or by the telephone line.

BRIEF DESCRIPTION OF THE DRAWINGS

The invention will be better understood on reading the description which follows, given merely by way of example and set out with reference to the appended drawings in which.

DETAILED DESCRIPTION OF THE INVENTION

Figure 1:
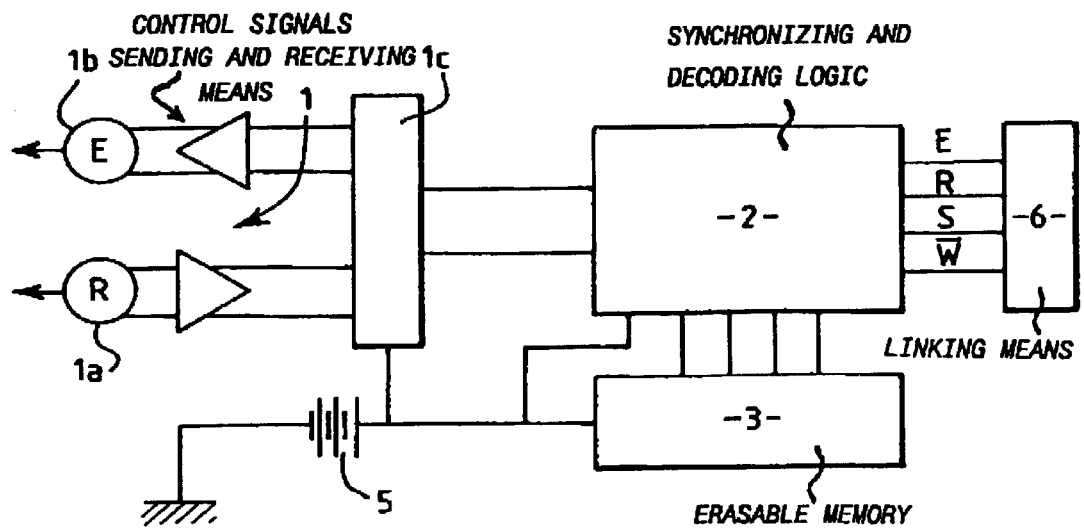
FIG. 1 is a schematic diagram of the transmitting device according to the invention.

The transmitting device represented in FIG. 1 includes an infrared sender/receiver module 1 comprising a receiver 1a, a sender 1b, an associated modem 1c, a logic module 2 for prewired or programmed decoding and synchronization of the electrical signals and an electrically erasable memory 3 such as an EEPROM memory or a FLASH memory.

The device furthermore includes a power source comprising a battery 5.

It moreover includes a connector 6 intended to allow it to be linked to a computer console.

The connector 6 comprises an input E, an output R, a clock synchronization socket S1 and a read/write socket $\overline{W}$.

The device is firstly configured with an item of equipment such as an office computer (not represented) to which it is attached by its connector 6.

For this purpose, it is fitted to the serial port of the computer and a control voltage is applied to one of the pins of the device.

The computer loads the memory 3 of the device with the configuration data required for the control operations pertaining to the item of equipment of the abode to which the device is assigned and completes its involvement by registering the owner's identification key into the memory 3 for subsequent authentication of the user.

Once the configuration operation is accomplished, the control voltage is withdrawn and the device waits to be fitted to the serial port of a PC type computer or of a portable game console.

The logic module 2 monitors the following concurrence.

A silence of a minimum duration, for example 100 ms, and a code transmitted in serial mode on the input socket so as to undertake an exchange of data on the connector.

These two conditions being conjoined, the logic module 2 identifies the code with the help of the authentication key, and then delivers the data table stored in the memory 3, on the output pin of its serial interface via the connector 6 with the computerized console.

If these conditions are not conjoined, the logic module 2 merely copies and transmits the information received from the console over to the send pin of the transmitting module and conversely reproduces the signals received by the transmitting module 1 on the receiving pin.

At the very most, it will adapt the transmission speeds within known limits and will take care of certain transmission protocol elements in respect of the standard processes (RC5 protocol from Philips).

If the necessary energy for the transmitting module 1 cannot be supplied by the console, the device takes its energy from the battery 5.

Likewise, if the computerized console is of the mobile games console type having no rear-lighting for the liquid-crystal screen, the device uses some of the energy from its internal energy source 5 so as to offer side lighting of the screen.

The use of the module represented in FIG. 1 is as follows.

The module is offered to electricity and gas subscribers within the context of an offer of services.

The module is configured at the distributor's, for example at the local agency of the electricity distributor, by a customer-care agent, during discussions with the customer regarding his domestic equipment and his telecontrol requirements.

The agent collects the list of equipment which may be controlled by the device either directly, or by way of the multiservice box, organizes the installation into zones and proposes to the customer clusters to suit. The corresponding information is transcribed into a configuration file.

The initial configuration is completed by loading an authentication key into the module, and this will allow the console to be recognized by the multiservice socket of the subscriber's abode.

Later, when he is concerned with slight modifications to his domestic surroundings or to his comfort data, the customer can himself on self-service PCs at his local agency make alterations to his configuration which he will transfer to his transmitting device.

Having returned home, the subscriber uses his device for direct-access commands by actuating buttons carried by the device or fits his module to his PC or his game console.

He fits to the console, for example, a software cartridge, provided to him by the local agency, for managing the item of equipment, and switches on his console.

The software included within his game cartridge or within the memory of the PC associated with the transmitting device initializes the device and reads the proposed configuration as well as the abode and customer authentication key.

With the help of his console, the subscriber can from his abode interrogate the multiservice socket with which his installation is equipped and which will be described with reference to FIG. 3 so as to consult the state of his energy tappings, the movement in his consumption, the evaluation of his consumption and to read the messages transmitted for his attention by the service providers.

When taken into a room, the console receives the information via relay/sender pads of the site of the console and proposes to the subscriber the commands, according to a standard ergonomics, for the equipment placed in this room or which can be contacted by way of relays situated in this room.

Figure 2:
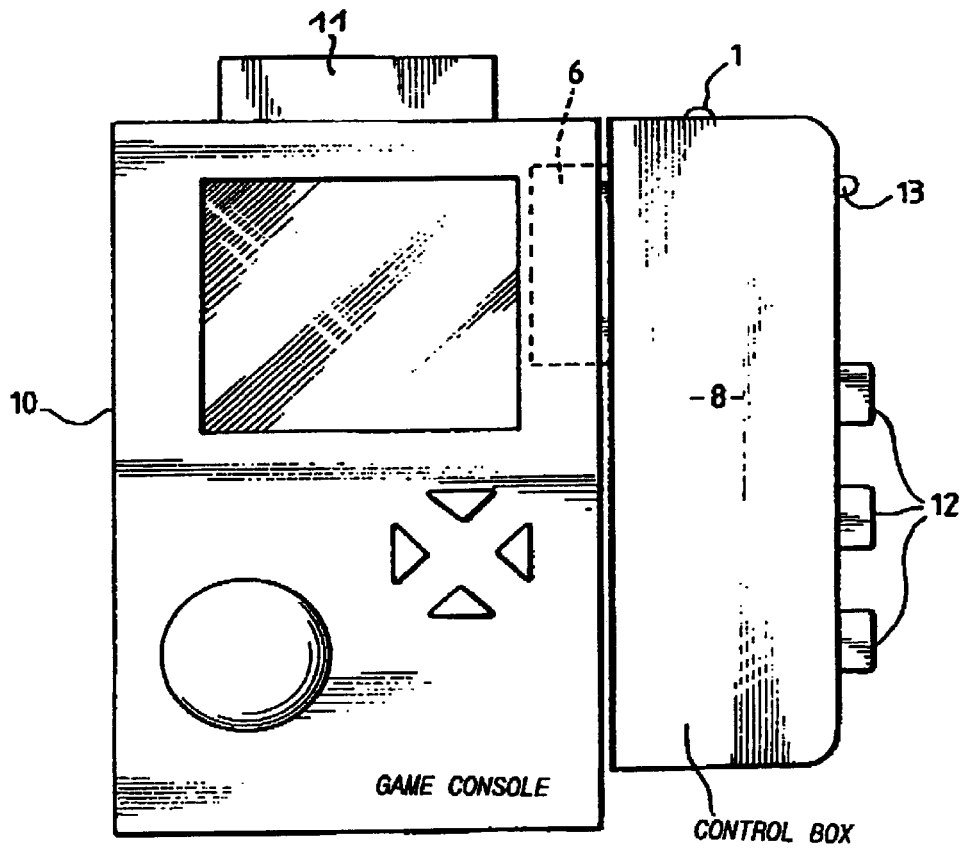
FIG. 2 is a diagrammatic view of a game console equipped with a control box containing the transmitting device of FIG. 1.

Represented in FIG. 2 is the transmitting device according to the invention in the form of a control box 8 connected by its connector 6 to a game console 10 containing a microprocessor (not represented) which is entirely sufficient to ensure the operation of the device and is furnished with a plug-in cartridge 11 containing the software for managing the equipment of an abode.

The box 8 includes its infrared send/receive head 1 as well as operating buttons 12 in respect of function macrocommands and a light-emitting signalling diode 13.

These function macrocommands can contain instructions for the installation corresponding to the situation created by each macrocommand.

If the depressing of an operating button 12 indicates the absence of the occupant for a short period, 10 min for example, the equipment of the abode will receive the following instructions:

maintain comfort, trip anti-intrusion means around the perimeter and volume of the apartments of the abode.

If the depressing of another operating button 12 indicates that the abode is closed for the summer, the instructions will then be:

make safe from gas, perimeter and volume alarm, automatic watering of plants or the garden, shut down heating.

The depressing of another button may further correspond to the placing of the abode under the conditions of maximum comfort, "cocooning".

Figure 3:
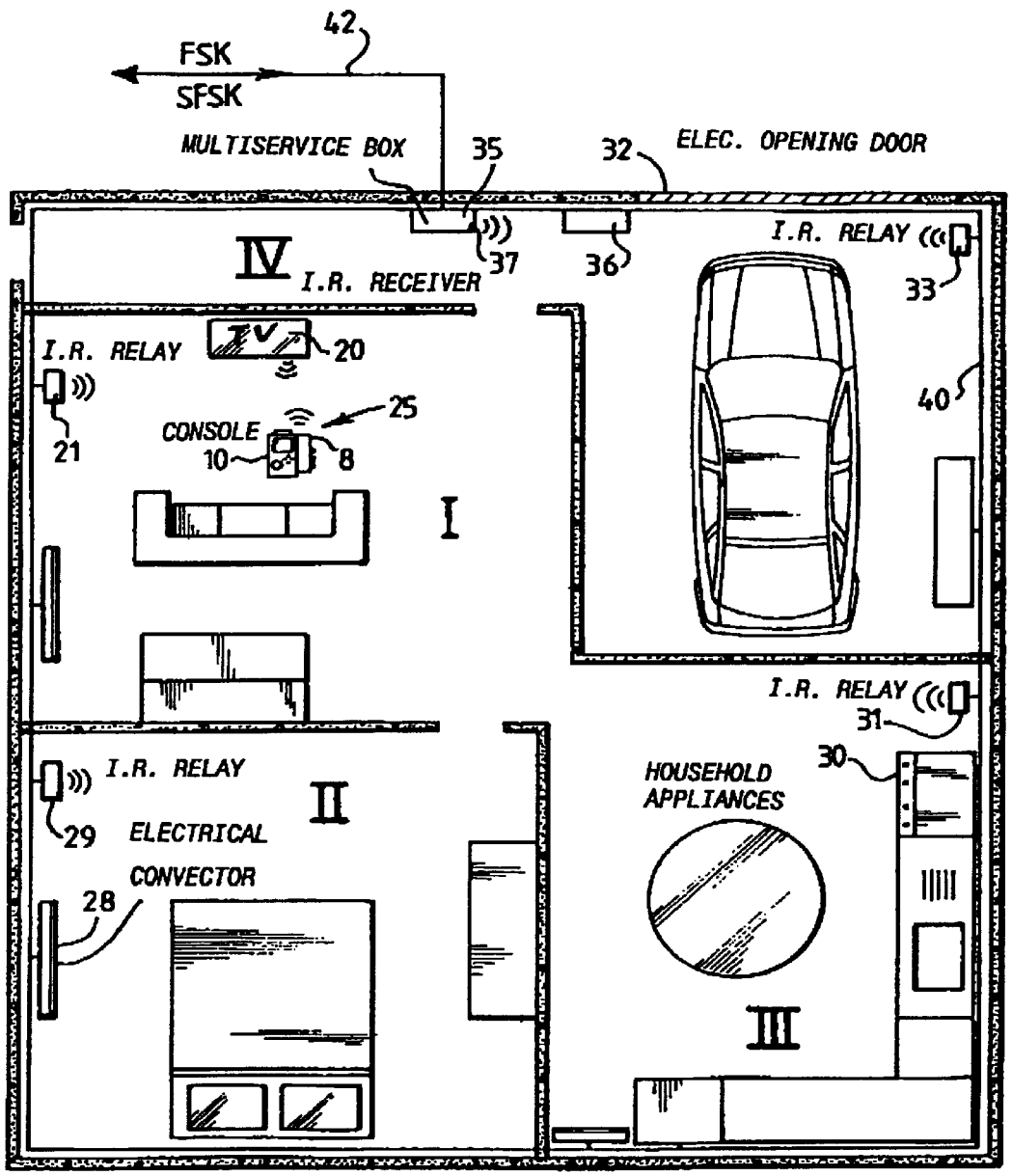
FIG. 3 represents the plan of an abode equipped with means allowing the use of the transmitting device according to the invention.

Represented in FIG. 3 is the plan of an abode provided with equipment for controlling household appliances with the help of the device of the invention.

This abode is of the type divided into four zones each including electrical appliances to be controlled.

These are the lounge I in which is installed a television 20 which can be controlled by an infrared relay 21 communicating with the transmitting device according to the invention, represented by the general reference 25 and comprising the game console 10 and the transmitting device 8 (FIG. 2).

A bedroom II includes for example an electrical convector 28 controlled by an infrared relay 29 communicating with the transmitting device.

A kitchen III equipped with household electrical appliances 30 controlled by an associated infrared relay 31.

A garage IV having an electrically opening door 32 controlled by an infrared relay 33.

Positioned in the hallway is a multiservice box 35 associated with the meter 36 of the electrical installation and including infrared receiver means 37.

The infrared relays of the installation are linked together by a carrier-current CPL line 40.

The multiservice box 35 is connected to a call concentrator of a distribution agency (not represented) by a telephone line or by a line 42 of the distribution network, for transmitting call signals under S-FSK modulation and alarm signals under FSK modulation in the manner described in particular in French patent application No. 96 02 568 filed on Feb. 29, 1996 by the Applicant.

As indicated above, the multiservice box 35 communicates with the exterior of the abode via the line 42 for linking with the call concentrator situated in a distribution agency.

Figure 4:
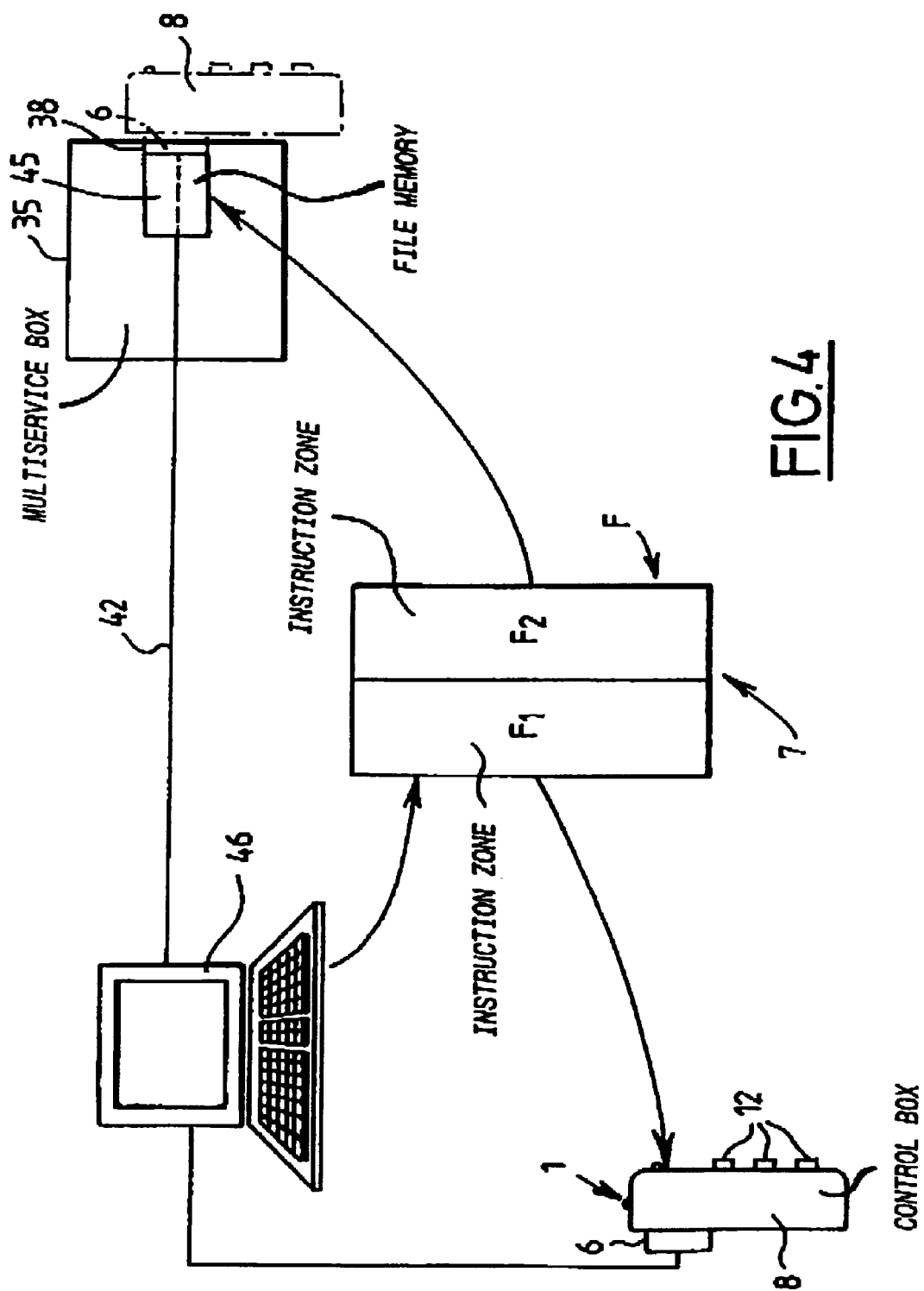
FIG. 4 is a diagram representing the means for loading a configuration file of the electrical installation of an abode into the transmitting device according to the invention and into the installation proper.

As represented in FIG. 4, it moreover includes a connector 38 for linking with the connector 6 of the transmitting device.

It also communicates with the interior of the abode:

a) by infrared radiation b) by carrier currents of the local electrical network.

To allow the abode of FIG. 3 to receive commands with the help of the device according to the invention, the occupant of the abode assists in entering into a computer, situated for example in a distribution agency, the elements of usage of his equipment which can be controlled by way of the multiservice box 35 and those which can be controlled directly by infrared signals, organized according to zones I to IV of the installation.

The elements are processed and printed in the form of a file F represented in FIG. 4, which includes a zone F1 containing the instructions which can be transmitted by the transmitting device when it is associated with the game console 10 and a zone F2 containing instructions which can be transmitted by the transmitting device alone.

The data of the file are transmitted to the EEPROM or FLASH type memory 3 of the transmitting device of FIG. 1.

The box 8 of the transmitting device can then be used alone to send, with the help of its operating buttons 12, macrocommands of the type described above.

These macrocommands are received by the infrared receiver 37 of the multiservice box 35 and transmitted by the carrier-current line 40 to the devices of the installation which are able to execute the various instructions contained in each of the macrocommands.

When the device is associated with a microcomputer or with the game console 10 as represented in FIG. 2, it effects detailed commands for equipment of the installation located in one of the zones I to IV of the abode of FIG. 3 or else for general-interest equipment.

Each of the four zones I to IV possesses an infrared relay 21, 29, 31, 33 linked to the carrier-current line 40.

Each relay sends an identity signal for the corresponding zone which is received by the receiver 1*a* of the transmitting device of FIG. 1 and relays the messages according to a home-automation protocol (EHS, Echelon or the like) between the transmitting device and the multiservice socket 35.

Thus, the transmitting device according to the invention, alone or associated with a console, can respectively send general macrocommands or specific commands to each zone according to the protocol for direct infrared control of the equipment or else for interpretation of the command by way of the home-automation protocol through or without the multiservice box 35.

The possible transmission schemes are as follows:

a) command RC5 (Philips)>equipment b) command RC6 +EHS>home-automation relay EHS>equipment c) command RC6 +EHS>home-automation relay EHS>multiservice box EHS>equipment.

The multiservice box 35 is used when conversions are to be made between a macrocommand triggered by one of the operating buttons 12 of the box 8 of the transmitting device according to the invention and a set of instructions which it involves such as the tripping of an alarm, the simulating of presence by programmed actuation of the lighting, a reduced comfort setting.

For transmissions a) and b), a confirmation is produced by the relay 21, 29, 31 or 33 destined for the transmitting device of the invention.

In order to transfer to the installation with which the abode of FIG. 3 is equipped, the configuration set up initially by building the file stored in the memory 3 of the device, the file is transferred to the multiservice box 35 by physically connecting the box 8 of the transmitting device by its connector 6 to the multiservice box 35 which includes for this purpose a memory 45 for the file as represented in FIG. 4.

This loading of the multiservice box can also be carried out directly by carrier currents from the computer 46 of the distribution agency having served to build the file stored in the transmitting device according to the invention.

According to a variant, the loading of the file F into the memory 3 of the transmitting device is carried out from a pc computer owned by the user.

What is claimed is:

1. A device for transmitting commands to a suite of equipment of an electrical installation of an abode, including means (1, 1*a*, 1*b*, 1*c*) for sending and receiving control signals in the form of modulated infrared or radio waves in conjunction with means (21, 29, 31, 33, 35) for transmitting control signals via carrier currents to equipment of the installation to be actuated, wherein said device is located in a remote control box, and furthermore includes logic (2) for decoding and synchronizing the electrical signals received by the receiving means (1*a*), an electrically erasable memory (3) for storing a file (F) containing commands organized in accordance with the configuration of the installation, and means (6) for linking the device with means (46) for generating the file (F) of commands organized according to the configuration of the installation, wherein the means for sending and receiving control signals comprises a receiver (1*a*) of identity signals relating to zones (I to IV) of the installation and emanating from corresponding sending means (21, 29, 31, 33), a sender (1*b*) of control signals to said means (21, 29, 31, 33, 35) for transmitting via carrier currents, and a modem (1*c*) linking said sending and receiving means to the decoding and synchronization logic unit (2), said transmitting device including operating buttons (12) which control the sending by the device of macrocommands stored in the file (F) located in the memory (3)

and each containing a series of instructions for particular items of the equipment of the installation which are required to be actuated so as to place it in a situation determined by the macrocommand, wherein said installation includes a multiservice box (35) linked to a carrier-current line (40) and to a line (42) of the distribution network or to a telephone line effecting a carrier-current link with a distribution agency and provided with an infrared or radio-wave relay (37) for communicating with the transmitting device (8, 10) so as to interpret and transmit, by way of the carrier-current line (40), to appliances of the installation, the instructions which concern them contained in the commands which it receives from the transmitting device.

2. The transmitting device as claimed in claim 1, wherein it is linked in a removable manner to a microprocessor (10) effecting detailed commands for equipment of the installation located in one of several zones (I to IV) of said installation or else for general-interest equipment, the transmitting device being linked by its means for linking (6) to the microprocessor (10) and the latter being associated with software (11) for managing the installation allowing the transmitting device to transmit commands intended for specific appliances of the installation.

3. The transmitting device as claimed in claim 2, wherein the microprocessor (10) forms part of a game console and the management software is stored in a cartridge (11) plugged into the box (8) of the game console.

4. The transmitting device as claimed in claim 2, wherein the microprocessor forms part of a PC type microcomputer to which the device is connected.

5. The transmitting device as claimed in claim 1, wherein the multiservice box (35) includes a memory (45) for storing the file (F) organized according to the configuration of the installation and a file for matching the macrocommands and individual commands for equipment.

6. The transmitting device as claimed in claim 5, wherein the multiservice box includes means (38) for connection with the means for linking (6) of the transmitting device so as to load the file (F) organized according to the configuration of the installation into the memory (45) for storing the file of the multiservice box (35).

7. The transmitting device as claimed in claim 5, wherein the multiservice box (35) is linked by the line (42) of the distribution network or by the telephone line to the means (46) for generating the file (F) organized according to the configuration of the installation and the file for matching the macrocommands and individual commands for the equipment, the loading of said files being effected directly by way of the line (42) of the distribution network or of the telephone line.

8. An electrical installation controlled by a transmitting device for transmitting commands to a suite of equipment of an electrical installation of an abode, including means (1, 1*a*, 1*b*, 1*c*) of sending and receiving control signals in the form of modulated infrared or radio waves in conjunction with means (21, 29, 31, 33, 35) for transmitting control signals via carrier currents to equipment of the installation to be actuated, wherein said device is located in a remote control box and it furthermore includes logic (2) for decoding and synchronizing the electrical signals received by the receiving means (1*a*), an electrically erasable memory (3) for storing a file (F) containing commands organized in accordance with the configuration of the installation and means (6) for linking the device with means (46) for generating the file (F) of commands organized according to the configuration of the installation and wherein the means for sending and receiving control signals comprise a receiver (1*a*) of identity signals relating to zones (I to IV) of the installation and emanating from corresponding sending means (21, 29, 31, 33), a sender (1*b*) of control signals to said means (21, 29, 31, 33, 35) of transmitting via carrier currents, and a modem (1*c*) linking said sending and receiving means to the decoding and synchronization logic unit (2**);

wherein said transmitting device is linked in a removable manner to a microprocessor (10) effecting detailed commands for equipment of the installation located in one of several zones (I to IV) of said installation or else for general-interest equipment, the transmitting device being linked by its means for linking (6) to the microprocessor (10) and the latter being associated with software (11) for managing the installation allowing the transmitting device to transmit commands intended for specific appliances of the installation;

wherein said installation includes infrared or radio-wave relays (21, 29, 31, 33) for transmitting the control signals received from the control device to the appliances (28, 30, 32) of the installation, said relays being linked to said appliances by a carrier-current line (40); and wherein said installation furthermore includes a multiservice box (35) linked to the carrier-current line (40) and to a line (42) of the distribution network or to a telephone line effecting the carrier-current link with a distribution agency and provided with an infrared or radio-wave relay (37) for communicating with the transmitting device (8, 10) so as to interpret and transmit, by way of the carrier-current line, (40) to the appliances of the installation the instructions, which concern them, contained in the commands which it receives from the transmitting device.

9. The electrical installation as claimed in claim 8, wherein the multiservice box (35) includes a memory (45) for storing the file (F) organized according to the configuration of the installation and a file for matching the macrocommands and individual commands for equipment.

10. The electrical installation as claimed in claim 9, wherein the multiservice box includes means (38) for connection with the means for linking (6) of the transmitting device so as to load the file (F) organized according to the configuration of the installation into the memory (45) for storing the file of the multiservice box (35).

11. The electrical installation as claimed in claim 9, wherein the multiservice box (35) is linked by the line (42) of the distribution network or by the telephone line to the means (46) for generating the file (F) organized according to the configuration of the installation and the file for matching the macrocommands and individual commands for the equipment, the loading of said files being effected directly by way of the line (42) of the distribution network or of the telephone line.

* * * * *